(12) United States Patent
Paolone et al.

(10) Patent No.: US 9,774,191 B2
(45) Date of Patent: Sep. 26, 2017

(54) REAL-TIME CONTROL OF MICROGRIDS WITH EXPLICIT POWER SETPOINTS: UNINTENTIONAL ISLANDING

(71) Applicant: ECOLE POLYTECHNIQUE FEDERALE DE LAUSANNE (EPFL), Lausanne (CH)

(72) Inventors: Mario Paolone, La Conversion (CH); Jean-Yves Le Boudec, Jouxtens Mezery (CH); Andrey Bernstein, St-Sulpice VD (CH); Lorenzo Enrique Reyes Chamarro, Epalinges (CH)

(73) Assignee: ECOLE POLYTECHNIQUE FÉDÉRALE DE LAUSANNE (EPFL), Lausanne (CH)

( * ) Notice: Subject to any disclaimer, the term of this patent is extended or adjusted under 35 U.S.C. 154(b) by 250 days.

(21) Appl. No.: 14/846,782

(22) Filed: Sep. 6, 2015

(65) Prior Publication Data
US 2017/0070048 A1    Mar. 9, 2017

(51) Int. Cl.
*H02J 3/38*        (2006.01)
*H03L 5/00*       (2006.01)
(Continued)

(52) U.S. Cl.
CPC .............. *H02J 3/38* (2013.01); *G05B 13/04* (2013.01); *H02J 3/14* (2013.01);
(Continued)

(58) Field of Classification Search
CPC .......... H02J 3/38; H02J 3/14; H02J 2003/388; G05B 13/04; Y02P 80/14; Y02P 80/152
(Continued)

(56) References Cited

U.S. PATENT DOCUMENTS

| | | | |
|---|---|---|---|
| 2013/0018521 A1* | 1/2013 | Manson | H02J 3/14 700/297 |
| 2013/0289772 A1* | 10/2013 | Friedrich | G05B 13/02 700/276 |

OTHER PUBLICATIONS

IEEE on "Agent-based intelligent control for real-time operation of a microgrid", By: H. N. Aung, Dec. 2010.*
(Continued)

*Primary Examiner* — Robert Fennema
*Assistant Examiner* — Jigneshkumar Patel
(74) *Attorney, Agent, or Firm* — The Law Office of Joseph L. Felber

(57) ABSTRACT

The invention provides a method for coping with an unintentional islanding of an electrical distribution grid within a Commelec-type framework for the real-time control of micro-grids, of Resource Agents (RA) controlled by Grid Agents (GA), comprising at least maintain at any time before the unintentional islanding occurs a rating of all resource agents controlled by a same grid agent in view of their ability to be a slack resource, by computing the rating based on a power availability and on a state-of-energy of each resource, the state-of-energy quantifying an amount of energy that may be withdrawn from a potential slack irrespectively of a PQ profile, whereby the PQ profile describes bounds for active and reactive power that a resource can inject or absorb; and a shedding list of all the resources that have to be shed if a current best candidate slack resource is selected, the current best candidate slack resource being the slack resource having the best rating of all resources as determined in the step of rating all resource agents, the shedding list being obtained by computing from an uncertainty of the resources and a predetermined order of shedding priority. The method further comprises continuously monitor islanding conditions via an available real-time state estimation process, and when an islanding condition is (Continued)

detected, causing the grid agent to shed all resources in the shedding list and choose an initial slack based on the rating obtained before the islanding occurrence from the step of rating of all resource agents.

11 Claims, 7 Drawing Sheets

(51) Int. Cl.
    *H02J 3/14*         (2006.01)
    *G05B 13/04*      (2006.01)

(52) U.S. Cl.
    CPC ..... *H02J 2003/388* (2013.01); *Y02B 70/3225* (2013.01); *Y02P 80/14* (2015.11); *Y02P 80/152* (2015.11); *Y04S 20/222* (2013.01)

(58) Field of Classification Search
    USPC ........................................................ 700/295
    See application file for complete search history.

(56) References Cited

OTHER PUBLICATIONS

IEEE on "Real-Time Control of Microgrids with Explicit Power Setpoints: Unintentional Islanding" by : Andrey Bernstein, Added to IEEE on Sep. 3, 2015.*

Bloemink et al., Control of a Multiple Source Microgrid With Built-in Islanding Detection and Current Limiting, IEEE Transactions on Power Delivery, vol. 27, No. 4, Oct. 2012, pp. 2122-2132.

Gomez-Exposito et al., A Multilevel State Estimation Paradigm for Smart Grids, Proceedings of the IEEE | vol. 99, No. 6, Jun. 2011, pp. 952-976.

Lopes et al., Defining Control Strategies for MicroGrids Islanded Operation, IEEE Transactions on Power Systems, vol. 21, No. 2, May 2006, pp. 916-924.

Papathanassiou et al., A Benchmark Low Voltage Microgrid Network, Presented at the CIGRE Symposium "Power systems with dispersed generation: technologies, impacts on development, operation and performances", Apr. 2005, Athens, Greece.

Chiang et al., On the Existence and Uniqueness of Load Flow Solution for Radial Distribution Power Networks, IEEE Transactions on Circuits and Systems, vol. 31, No. 3, Mar. 1990, pp. 410-416.

Bernstein et al., Electric Power Systems Research, Electric Power Systems Research 125 (2015), pp. 254-264.

Torregrossa et al., Improvement of Dynamic Modeling of Supercapacitor by Residual Charge Effect Estimation, IEEE Transactions on Industrial Electronics, vol. 61, No. 3, Mar. 2014, pp. 1345-1354.

Fu et al., Transition Management of Microgrids With High Penetration of Renewable Energy, IEEE Transactions on Smart Grid, vol. 5, No. 2, Mar. 2014, pp. 539-549.

Paolone et al., A Hardware-in-the-Loop Test Platform for the Real-Time State Estimation of Active Distribution Networks using Phasor Measurement Units, Distribution Systems and Dispersed Generation, CIGRE SC C6 Colloquium, Yokohama 2013, pp. 92-97.

Palma-Behnke et al., A Microgrid Energy Management System Based on the Rolling Horizon Strategy, IEEE Transactions on Smart Grid, vol. 4, No. 2, Jun. 2013, pp. 996-1006.

Del Carpio-Huayllas et al., Microgrid Transition to Islanded Modes: Conceptual Background and Simulation Procedures Aimed at Assessing its Dynamic Performance, pp. 1-6.

* cited by examiner

REAL-TIME CONTROL OF MICROGRIDS WITH EXPLICIT POWER SETPOINTS: UNINTENTIONAL ISLANDING

TECHNICAL FIELD

The invention relates to the field of distributed energy resources in low and medium voltage power networks.

BACKGROUND

The trend of vast penetration of distributed energy resources (DERs, such as PV or wind farms) in low and medium voltage power networks calls for a substantial improvement in the control methods of these systems due to the two conflicting contributions of DERs. On one hand, more flexibility is added to the networks, which allows for a better and more reliable operation on local scales. In particular, local power balances in low-voltage grids become possible, creating the so-called microgrids in the distribution networks. On the other hand, the high volatility of DERs can cause unpredictable reductions in the quality-of-supply. In this context, the local resilience of the system against major external disturbances (e.g., faults and blackouts) can be substantially improved if the microgrid is capable of performing an islanding maneuver (i.e., the disconnection from the main grid subsequent to an intentional or non-intentional decision, e.g., [7]).

Usually, the real-time control of microgrids is performed using droop controllers that react to frequency and voltage, while non real-time control decisions are taken by suitably defined management systems [8]. In this context, the strategy for an islanding maneuver relies on the availability of a classic slack resource with mechanical rotating inertia. Hence, the slack resource is normally predefined and, in case the islanding takes place when there is a large power import from the external grid, a shedding scheme may be required to avoid system collapse. Moreover, the sub-second control is not addressed directly, as it is left to the local droop controllers. The main advantages of this control strategy is its simplicity of implementation, as it relies on the fitting of few parameters, and that it inherently ensures that all droop-controlled units contribute to the power imbalance caused by the islanding.

In contrast, the main disadvantages are: the ignorance of the state of the pre-selected slack, which may be very dynamic, especially for electrochemical storage devices and the use of locally-controlled shedding schemes that may trigger all non-critical loads at a given frequency threshold.

Recently, a different framework for the real-time control of active distribution networks, and in particular microgrids with little or null inertia, has been proposed in [1]. With the Commelec framework, electrical resources in the microgrid are under the control of one or several grid agents, which define explicit power setpoints in real-time (i.e., every ~0.1 sec). Contrary to classic strategies, this mode of operation exposes the state of all resources to the local grid controller, enabling an efficient and stable operation without large rotating masses. The framework is designed to be robust (i.e., it avoids the problems inherently posed by software controllers) and scalable (i.e., it easily adapts to grids of any size and complexity). It uses a hierarchical system of software agents, each responsible for a single resource (loads, generators and storage devices) or an entire subsystem (including a grid and/or a number of resources). It is abstract in the sense that it applies to all electrical subsystems and specifies their capabilities, expected behavior, and a simplified view of their internal state using a common, device-independent protocol.

With the present invention, one aim is to add to the Commelec real-time control framework the ability to support unintentional islanding.

SUMMARY OF THE INVENTION

According to a first aspect, the invention provides a method for coping with an unintentional islanding of an electrical distribution grid within a Commelec-type framework for the real-time control of micro-grids, of Resource Agents (RA) controlled by Grid Agents (GA), comprising at least maintain at any time before the unintentional islanding occurs a rating of all resource agents controlled by a same grid agent in view of their ability to be a slack resource, by computing the rating based on a power availability and on a state-of-energy of each resource, the state-of-energy quantifying an amount of energy that may be withdrawn from a potential slack irrespectively of a PQ profile, whereby the PQ profile describes bounds for active and reactive power that a resource can inject or absorb; and a shedding list of all the resources that have to be shed if a current best candidate slack resource is selected, the current best candidate slack resource being the slack resource having the best rating of all resources as determined in the step of rating all resource agents, the shedding list being obtained by computing from an uncertainty of the resources and a predetermined order of shedding priority. The method further comprises continuously monitor islanding conditions via an available real-time state estimation process, and when an islanding condition is detected, causing the grid agent to shed all resources in the shedding list and choose an initial slack based on the rating obtained before the islanding occurrence from the step of rating of all resource agents.

In a preferred embodiment when an islanding condition has been detected, the rating of all resource agents is monitored, and in case the rating is found to have changed, the grid agent chooses a new slack.

In a further preferred embodiment an operation of the Commelec-type framework is monitored, and when it is found that there is no feasible operation point with the selected slack, the grid agent performs a further shedding of all resources in the shedding list, and wherein when an islanding condition has been detected, the rating of all resource agents is monitored, and in case the rating is found to have changed, the grid agent chooses a new slack.

In a further preferred embodiment, the rating of all resource agents comprises from each of all resource agents controlled by the same grid agent, sending its state-of-energy to the same grid agent.

In a further preferred embodiment, the rating all the resource agents comprises the computation of a metric $\rho_C(i)$ for resource agent i, that measures the distance between a request (P,Q), and the belief function $BF_i(P, Q)$ advertised by resource agent i representing the set of all possible power setpoints that resource i is enabled to implement when instructed by the grid agent to do (P, Q).

In a further preferred embodiment the rating of all the resource agents comprises the computation of a metric $\rho_U(i)$ that indicates whether resource i is an admissible slack without shedding any other resource, $\rho_U(i)$ is computed by first evaluating the set $\mathcal{U}_i$ of admissible setpoints when resource i is the slack, and setting $\rho_U(i)=1$ if $\mathcal{U}_i$ is empty and zero otherwise.

In a further preferred embodiment the method further comprises measuring the electrical state of the grid. The rating of all the resource agents further comprises a computation of a first metric $\rho_{P,1}(i)$ and a second metric $\rho_{P,2}(i)$ that together measure an ability of the resource i to absorb an imbalance in the grid created by the measured electrical state of the grid taking into account uncertainties as represented by belief functions advertised by resource agent i, specifically, whereby the first metric $\rho_{P,1}(i)$ measures a safety margin of the resource i and when the safety margin is null, the second metric $\rho_{P,2}(i)$ quantifies an amount of maximum violation of resource i.

In a further preferred embodiment the rating of all the resource agents further comprises the computation of a third metric $\rho_{Y,1}(i)$ and a fourth metric $\rho_{Y,2}(i)$ computed according to $$\rho_{Y,1} \triangleq \min_{y \in y_i(\hat{x}-i)} d(y, \mathcal{F}_i^c) \text{ and}$$

$$\rho_{Y,2} \triangleq \max_{y \in y_i(\hat{x}-i)} d(y, \mathcal{F}_i) \text{, where}$$

$$y_i(u_{-i}) \triangleq \{y = Y_i(x_{-i} \mid i): x_{-i} \in BF_{-i}(u_{-i})\}$$

denote the set of all possible electrical states that may result from the uncertainty of all resources but i when i is the slack, the third metric and the fourth metric measuring an ability of resource i to provide a feasible electrical state when it is the slack, taking into account uncertainties represented by belief functions advertised by resource agent i, specifically, whereby the first metric $\rho_{Y,1}(i)$ measures the safety margin of resource i and when the safety margin is null, the second metric $\rho_{Y,2}(i)$ quantifies an amount of maximum violation of resource i.

In a further preferred embodiment the steps of computing of the rating comprises executing by the grid agent at least following steps in the following order:
a. computation of a fifth metric $\rho_T(i)$ according to $\rho_T(i) = \rho_E(i)/\tilde{P}_i$, where $\tilde{P}_i$ denotes the corresponding active power, the fifth metric estimating a survival time of the resource i when the resource i is used as a slack;
b. filtering out non-controllable resources and resources that have too short survival time, through the grid agent filtering out the non-controllable resources that are not controlled by the Commelec grid agent, and the resources that have too short a survival time, the resources that have too short a survival time being those for which $\rho_C(i) \leq \epsilon$, $\rho_T(i) \geq \delta$, for some $\epsilon \geq 0$ and $\delta > 0$, the value of $\epsilon$ representing the maximum allowed deviation of the actually implemented setpoint from the requested one in percentage from the requested one;
c. computation of a sixth metric $\rho_E(i)$ that measures the state of energy of a given resource i;
d. sorting the resources lexicographically,
  $\rho_U$, so that resources with $\rho_U(i)=0$, namely, having non-empty set of admissible setpoints, are on top;
  $\rho_{P,2}$ in ascending order, so that resources with the least violation of slack power feasibility are on top;
  $\rho_{Y,2}$ in ascending order, so that resources with the least violation of state feasibility are on top;
  $\rho_{P,1}$ in descending order, so that resources with the maximum power availability are on top;
  $\rho_{Y,1}$ in descending order, so that resources with the maximum state feasibility margins are on top;
  $\rho_E$ in descending order, so that the resources with the highest SoE are on top;
thereby finding a best-rated resource.

The solution presented herein comprises the following features. First, the agent responsible for the grid ("Grid Agent") can use the information received from the resource agents about their internal capabilities in order to choose the slack resource adaptively. Second, as the grid agent has a global view of the network and its resources, it is to optimize the network quality-of-supply during and after the islanding. Third, in many modern microgrids there is little or no-inertia. Thus, the existing droop-based methods should be modified to estimate the electrochemical inertia that represents the current stored energy available for reacting to a power perturbation. In contrast, our method is directly applicable to inertia-less systems as the control is performed using explicit power setpoints and it does not rely on the frequency signal.

BRIEF DESCRIPTION OF THE DRAWINGS

The invention will be understood better in view of the detailed description of preferred embodiments and in reference to the figures, wherein.

DETAILED DESCRIPTION OF PREFERRED EXAMPLE EMBODIMENTS

State-of-the-Art on Microgrids Islanding

Figure 1:
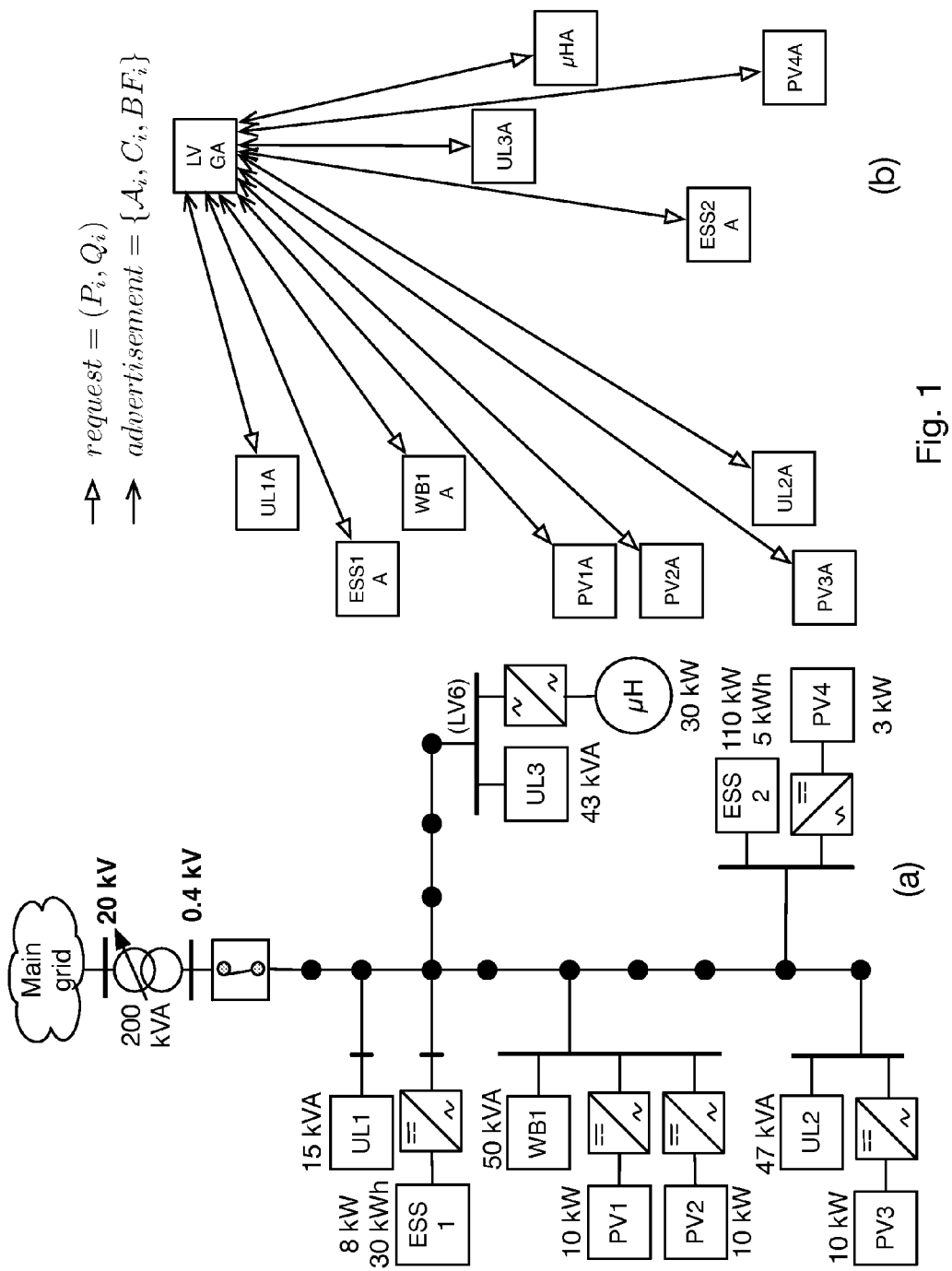
FIG. 1 shows an electrical network and agents for the case study. (a) Microgrid. (b) Agents. PV: photovoltaic plant. UL: uncontrollable Load. WB: Water Boiler. ESS: Energy Storage System. uH: micro-hydraulic generator. LVGA: Low-Voltage Grid Agent.

The unintentional islanding transition is the most difficult condition that can affect microgrids. The ability to cope with such a transition is key for ensuring the microgrid's resilience and dynamic performance [4]. In the following, when talking about islanding we always refer to the unintentional islanding transition. The state-of-the-art on mode transition of micro-grids is mainly based on the P-f/Q-V droop controls and can be roughly divided into two categories. In the first category, rotating machines are present in the microgrid and hence there is an intrinsic inertia for reacting to the islanding transition. In the second category, most of the resources are interfaced through power converters and thus the inertia is negligible or nonexistent.

In both cases, the use of at least one device working in the voltage source-mode (VS) is a common practice so that it can react automatically to changes in power, while all other resources work in the current source-mode (CS).

The first category is well-spread in industry by acting over the governor of diesel, steam or gas based synchronous machines to modify their speed and, hence, the grid frequency. In this category the most used strategy is the Load Drop Anticipator (LDA). This method acts on the preselected slack unit for anticipating the maximum frequency variation that might take place after the islanding. For this purpose it needs to know the value of the inertia of the machine.

In the second category, enhanced droop control strategies are proposed. They usually rely on a well-sized storage system to cope with the worst possible disturbances in an islanding transition. In [2], the use of different VS-CS resources configuration is discussed. It is shown that a VS-control strategy can be used for limiting the current output of the resource during the islanding transition so that the microgrid can successfully transit to the islanded mode. Load shedding is not discussed.

In [6], a transition scheduler is proposed where, in case of islanding, all non-critical loads are shed and PV units can be curtailed. The method shows very good results in its dynamic performance for the case under study. Unfortunately, the proposed strategy is customized for the case study and cannot be directly extended to any generic microgrid.

As mentioned, the existing methods are based on the action of local droop controllers. To the best of our knowledge, the only exception to this approach is the Commelec framework [1], which uses explicit control of power setpoints on a very frequent time scale. In the next section Commelec Framework, we describe some details of the framework that will be used subsequently in Section Unintentional Islanding Maneuver in the Commelec Framework to define the corresponding islanding procedure.

In the rest of the document, we intend for the term setpoint a couple (P,Q) of real numbers that the grid agent requests to implement to a given resource agent. We also say that the collection of setpoints requested from different resources is feasible if it leads to a feasible electrical state.

Commelec Framework

In the Commelec framework, a software agent is associated with a resource (henceforth called "Resource Agent", RA), or an entire system including a grid and/or a number of devices (henceforth called "Grid Agent", GA). An example of the agents' structure is shown in FIG. 1 (b), where the GA at LV level (LVGA) is in charge of controlling a group of RAs responsible for specific subsystems. The agents' relation corresponds to the case study shown in FIG. 1(a), which is used here to evaluate the performance of the proposed methods—see section Performance evaluation herein under for further details.

The framework uses a common, device-independent protocol for message exchange between the agents. It hides the specific details of the resources and exposes in an abstract way only the essential information needed for real-time control. In particular, each RA advertises its internal state to its GA using the following three elements.

PQ Profile and Virtual Cost.

The PQ profile of an RA is the region in the PQ-plane (for active and reactive power) that the subsystem under the control of this agent can deploy (negative power means consumption). The virtual cost function, defined for every (P, Q) in the PQ profile, is interpreted as the cost to this subsystem of applying a requested power setpoint. Its role is to quantify the propensity of this subsystem to deploy (P, Q) setpoints. Note that the cost is virtual and does not represent money.

Belief Function.

The belief function BF returns the set of all possible (actual) setpoints that the subsystem under RA control might implement. Specifically, assuming that the resource receives from its GA a request to implement a setpoint (P, Q), the actual setpoint (P', Q') that this subsystem does implement lies in the set BF(P, Q) with overwhelming probability. The belief function accounts for the uncertainty in subsystem operation. In particular, highly controllable sub-systems, such as batteries and generators, are expected to have (almost) ideal beliefs, namely $BF_i(P, Q)=\{(P, Q)\}$. For subsystems such as PV/wind farms, or loads, the belief function will return larger sets, to account for their volatility. At every time step, a given GA receives the following information: (i) the advertisement messages received from its resources (with PQ profiles, virtual costs, and belief functions), (ii) the power setpoint request obtained from a higher level GA, and (iii) the estimation of the current electrical state of the grid (using real-time methods as in [5], [9]). The goal of the GA is to steer the electrical state of its grid by explicitly setting the power setpoints so that (i) the virtual costs of its resources are minimized, (ii) the power setpoint request from a higher level grid is satisfied as much as possible and that (iii) the grid is in a feasible state of operation. The latter refers to static (rather than dynamic) feasibility, defined in terms of the nodal voltage magnitudes and line currents, as in [1]. We note that this static analysis is reasonable as we focus on microgrids with little or no inertia, with resources connected to the grid by power electronic interfaces. The process is repeated periodically every 100 ms, a value short enough to cope with the fastest possible volatility of distributed resources and large enough to be compatible with the need to estimate the electrical state of the grid.

Unintentional Islanding Maneuver in the Commelec Framework

In this section, we propose a procedure to cope with an unintentional islanding within the Commelec framework. Below is the outline of our method.

(a) At all time, in particular before the islanding event occurs the GA maintains two lists:

A rating of all the RAs controlled by the same GA in view of their ability to be a slack resource. This rating is computed based on the power availability and on the state-of-energy (SoE) of each resource. The SoE quantifies the amount of energy that can be withdrawn from a potential slack irrespectively of the PQ profile.

A list of all the resources (i.e., generators and loads) that have to be shed if the current best candidate slack resource (the first in the previous rating) is selected. This list can be computed from the uncertainty of the resources and an order of shedding priority. We assume the latter is given.

(b) Islanding conditions are continuously monitored via an available real-time state estimation process. When these conditions are detected, the GA sheds all resources in the shedding list and chooses an initial slack based on the current rating.

(c) The grid operation continues during the remainder of the islanding maneuver under the control of the GA as explained in Section Commelec Framework herein above. During this operation, two events can occur:
- The rating of the resources has changed, so that a new slack is selected.
- It is not possible to operate the grid with the current slack (but the rating did not change). In this case, a further load shedding is performed.

We detail the different steps below.

A. Criteria for Selecting the Slack Resources

In this section, we show how the information exchanged between the agents in the Commelec framework can be used to assist in choosing the most appropriate slack resource. In particular, we assume that the GA maintains a rating of all the resources based on (i) the state of energy (SoE) of each resource (in Wh), and (ii) the advertisements from the resource agents. We note that (i) should be sent by the resource agents to the GA, which can be done straightforwardly by adding a message type to the Commelec framework. Also, observe that the knowledge of (i) only is not enough to choose the best appropriate slack. Consider, for example, the case when the grid is consuming 10 kW and there are two possible slack resources, a battery with SoE=30 kWh and a supercapacitor with SoE=2 kWh. Without knowing the real-time constraints of these two resources, the natural choice according to the SoE would be the battery. However, if we know (from the advertised PQ profile) that the battery can only supply 5 kW whereas the supercapacitor can supply 60 kW, we will choose the supercapacitor as the default slack resource (with the possibility to switch later to the battery).

Below we propose a concrete way for preparing this rating. To that end, we introduce additional notation. We let $\mathcal{A}_i \subseteq \mathbb{R}^2$ and $BF_i : \mathcal{A}_i \to 2^{\mathbb{R}^2}$ denote the PQ profile and the belief function of resource i, respectively. We also define the Cartesian product $\mathcal{A} = \mathcal{A}_1 \times \ldots \times \mathcal{A}_n$, which is the overall PQ profile. The set of all the RAs setpoints is then denoted by $u=(P_1, Q_1, \ldots, P_n, Q_n) \in \mathcal{A}$, while the set of implemented (actual) setpoints is denoted by $x=(P'_1, Q'_1, \ldots, P'_n, Q'_n)$. Similarly, we let $BF(u)=BF_1(P_1, Q_1) \times \ldots \times BF_n(P_n, Q_n)$ denote the overall belief function, so that $x \in BF(u)$ by its definition.

For each candidate slack resource i, and any element (either vector or set) $\epsilon$, we let $\epsilon_{-i}$ denote the same element without considering the resource i. In particular, $\mathcal{A} = \mathcal{A}_1 \times \ldots \times \mathcal{A}_n$ denotes the overall PQ profile, omitting the PQ profile $\mathcal{A}_i$, and the same for $BF_{-i}$, $u_{-i}$, and $x_{-i}$.

When considering resource i as a slack, we let $Y(x_{-i}|i)$ denote the corresponding electrical state of the grid. Namely, it is the load-flow solution when i is the slack and the power setpoint for other resources is $x_{-i}$. In the context of radial distribution networks, it is known that this solution is unique if voltage magnitudes are kept close to nominal values [3]. Similarly, $X_i(x_{-i})$ is the resulting power at the slack bus. The feasibility of the electrical state $Y(x_{-i})$ is defined in terms of the voltage magnitudes and line currents, as in [1]. We denote the set of feasible states when i is the slack by $\mathcal{F}_i$. Finally, we let $\hat{x}=(\hat{P}_1, \hat{Q}_1, \ldots, \hat{P}_n, \hat{Q}_n)$ denote the current (measured) power setpoint.

We next define the following metrics that are used to rate the candidates for being a slack resource.

1) Controllability of the Resource: We would like to choose resources with no (or little) uncertainty in implementation of the requested setpoint. Recall that the belief function $BF_i(P,Q)$ is the set of all possible power setpoints that resource i may implement when instructed by the GA to do (P, Q). Hence, ideally, we would like to choose a resource with a "perfect" belief function, namely $BF_i(P,Q)=\{(P,Q)\}$. The first metric $\rho_C(i)$ then measures the distance between the perfect belief $\{P, Q\}$ and the advertised one. Formally, we set $$\rho_C(i) \triangleq \max_{(P,Q) \in \mathcal{A}_i} \max_{(P',Q') \in BF_i(P,Q)} \frac{d((P, Q), (P', Q'))}{\sqrt{P^2 + Q^2}},$$

where $d((P, Q), (P', Q'))$ is the distance imposed by the Euclidean norm. It can be seen that $\rho_C$ is the maximal set-to-set (Hausdorff) distance between the singleton $\{P, Q\}$ and $BF_i(P,Q)$ over all possible $(P, Q) \in \mathcal{A}_i$, measured in percentage relative to the requested setpoint (P, Q). We note that this normalization is essential in order to compare the controllability of resources with different power ratings.

2) Available Power Range: The following metrics measure the ability of resource i to absorb the imbalance in the grid created by the current measured setpoint taking into account the uncertainties as represented by the advertised belief functions. In particular, let $$ABF_i(u_{-i}) \triangleq \{(P_i, Q_i) = X_i(x_{-i}) : x_{-i} \in BF_{-i}(u_{-i})\}$$

denote the set of all possible power setpoints that may take place at the connection point of resource i given the uncertainty of all other resources defined by $BF_{-i}(u_{-i})$, or in other words the aggregated belief set for the slack power, computed at a given setpoint $u_{-i}$.

We define the metric $\rho_{P,1}(i)$ to measure the safety margins of resource i as follows:

$$\rho_{P,1} \triangleq \min_{(P_i,Q_i) \in ABF_i(\hat{x}_{-i})} d((P_i, Q_i), \mathcal{A}_i^c).$$

Here, $\mathcal{A}_i^c$ is the complement of $\mathcal{A}_i$ relative to $\mathbb{R}^2$, and d(x,S) denotes the Euclidean distance of x from the set S. Observe that a positive $\rho_{P,1}$ means that the current setpoint is "safe" in the sense that for any actual implementation, the resulting slack power is feasible. On the other hand, we define $\rho_{P,2}$ as the amount of maximum violation of resource i:

$$\rho_{P,2}(i) \triangleq \max_{(P_i,Q_i) \in ABF_i(\hat{x}_{-i})} d((P_i, Q_i), \mathcal{A}_i).$$

Figure 2:
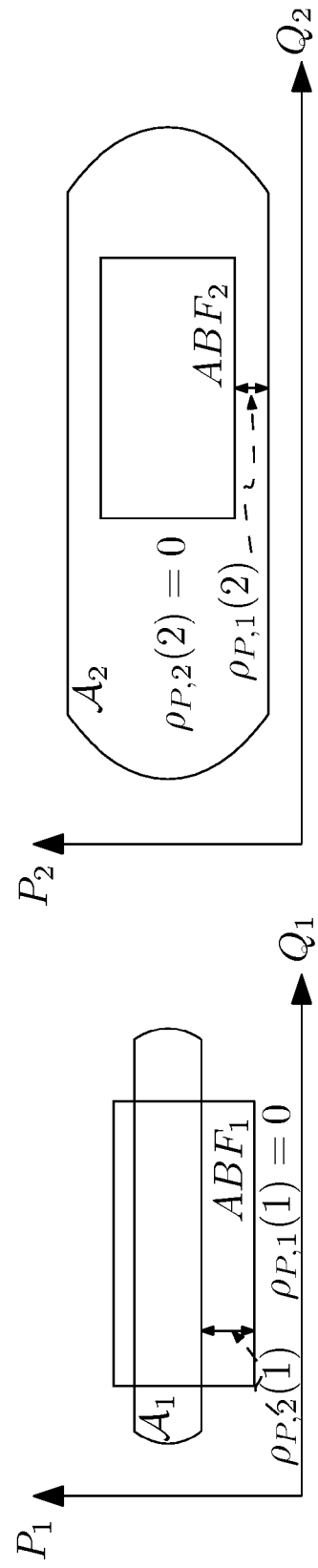
FIG. 2 is an illustration of the power availability metric. The case i=1 represents a storage system with low power availability, while the case i=2 represents a storage system with high power availability.

Note that $\rho_{P,2}$ is positive when the current setpoint may result in a non-feasible actual implementation. We illustrate this idea in FIG. 2.

3) Feasibility of the Electrical State: We next define metrics that measure the ability of resource to provide a feasible electrical state when it is the slack, taking into account the uncertainties represented by the advertised belief functions. Similarly to $ABF_i$, we let $$y_i(u_{-i}) \triangleq \{y = Y_i(x_{-i} \mid i) : x_{-i} \in BF_{-i}(u_{-i})\}$$

denote the set of all possible electrical states that may result from the uncertainty of all resources but i when i is the slack. We then compute the following two distances:

$$\rho_{Y,1} \triangleq \min_{y \in y_i(\tilde{x}-i)} d(y, \mathcal{F}_i^c), \rho_{Y,2} \triangleq \max_{y \in y_i(\tilde{x}-i)} d(y, \mathcal{F}_i)$$

Figure 3:
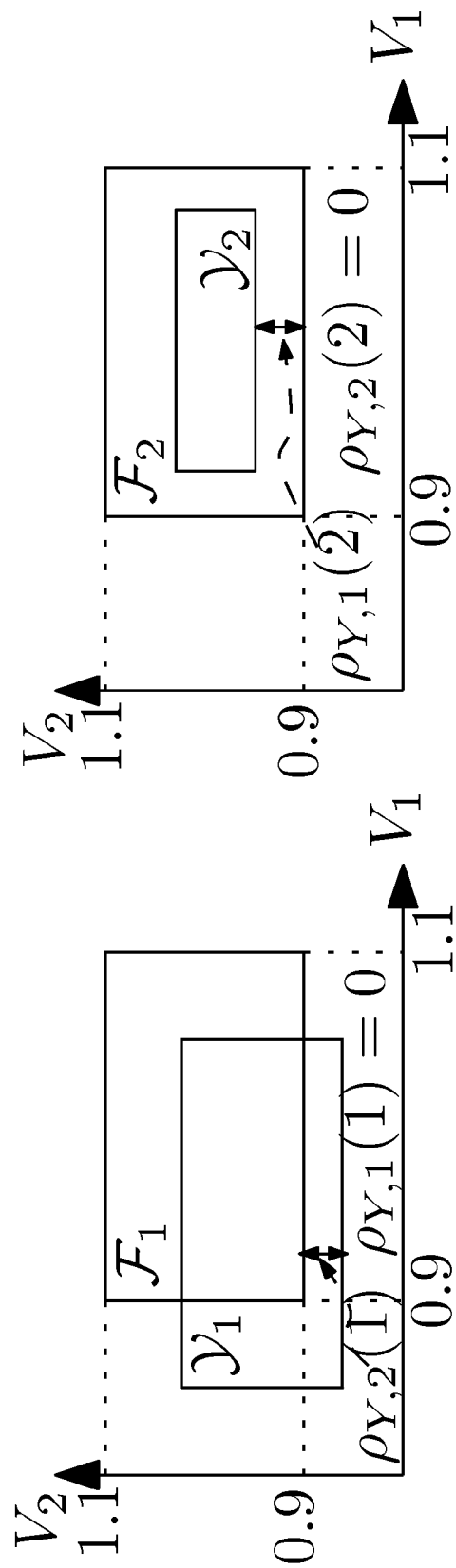
FIG. 3 is an illustration of the state-feasibility metric. We say that an electrical state is feasible if: (i) all the node voltages and branch/line currents are within pre-specified bounds and (ii) the apparent power flow in the slack bus is within a pre-specified range. If the resource i=1 is chosen as slack, it may lead to a non-feasible state ($\rho_{Y,2}(1)>0$). If the resource i=2 is chosen as slack, it is guaranteed that the state is feasible ($\rho_{Y,1}(2)>0$). For the simplicity of exposition, the feasibility is defined in terms of the two voltage magnitudes that are required to lie within the interval [0.9, 1.1]

With a similar interpretation to that of $\rho_{P,1}$ and $\rho_{P,2}$. We illustrate this metric in FIG. 3.

4) Admissibility of Setpoints: As in [1], we consider the set $U_i$ of admissible setpoints when resource i is the slack, that is the collection of target setpoints for all resources but the slack, $u_{-i} \in \mathcal{A}_{-i}$, so that (i) the resulting electrical state is feasible, and (ii) the resulting power at the slack bus fits the PQ profile $\mathcal{A}_i$ of the slack, for any actual implementation that is compatible with the belief functions. Formally, $\mathcal{U}_i$ can be written as $$\mathcal{U}_i = \{u_{-i} \in \mathcal{A}_{-i} : \mathcal{F}(u_{-1}) \subseteq \mathcal{F}_i, ABF_i(u_{-i}) \subseteq \mathcal{A}_i\}.$$

Observe that when $\mathcal{U}_i \neq \emptyset$, it is not possible to operate the grid with the current slack unless a shedding strategy is applied. We thus define a binary metric $$\rho_U(i) \triangleq \mathbb{I}\{\mathcal{U}_i = \emptyset\},$$

where $\mathbb{I}\{\bullet\}$ is the indicator function. We note that the exact computation of this metric is not feasible in the real-time framework as is not given explicitly (see [1]). However, a sufficient condition for $\mathcal{U}_i \neq \emptyset$ is that the GA is able to project the current setpoint to $\mathcal{U}_i$. As discussed in [1], the GA can use fast local projection methods for this purpose, and hence this computation is feasible. In the following, we thus identify the condition $\mathcal{U}_i \neq \emptyset$ with the ability to project to $\mathcal{U}_i$.

5) State of Energy (SoE): Observe that the interpretation of the SoE depends on whether the grid is producing or consuming power. Specifically, given the current setpoint, let $(\tilde{P}, \tilde{Q})$ denote the active and reactive power flows at the slackbus assuming that the grid is islanded and i is set to be the slack. We consider a directional metric, defined by $$\rho_E(i) = \begin{cases} (1 - SoE_i)E_{rated,i}, \\ SoE_i E_{rated}, \end{cases}$$

where $SoE_i$ is the state of energy of the resource i (in per unit of the rated power of a given resource), and $E_{rated,i}$ is its rated energy capacity. We note that this metric cannot directly be computed from the information advertised in the original Commelec framework [1], but can readily be obtained by a simple addition to the advertisement messages.

Using $\rho_E(i)$, we also estimate the "survival time" of a slack resource as follows: $\rho_T(i) = \rho_E(i)/\tilde{P}_i$, where $\tilde{P}_i$ denotes the corresponding active power.

6) Rating Computation: First, the GA filters out the non-controllable resources—namely, resources that are not controlled by the Commelec GA—and the resources that have too short a survival time—namely those for which $\rho_c(i) \leq \in$, $\rho_T(i) \geq \delta$, for some $\in \geq 0$ and $\delta \geq 0$. The value of $\in$ represents the maximum allowed deviation of the actually implemented setpoint from the requested one (in percentage from the requested one). The value of $\delta$ is chosen large enough so that the slack can absorb the imbalance during a plurality of Commelec cycles defined as a subsequent succession of resource agents' advertisements and grid agent requests. Then, it sorts the resources lexicographically, according to $\rho_U$, so that resources with $\rho_U(i) = 0$ (namely, having non-empty set of admissible setpoints) are on top;

$\rho_{P,2}$ in ascending order, so that resources with the least violation of slack power feasibility are on top;

$\rho_{Y,2}$ in ascending order, so that resources with the least violation of state feasibility are on top;

$\rho_{P,1}$ in descending order, so that resources with the maximum power availability are on top;

$\rho_{Y,1}$ in descending order, so that resources with the maximum state feasibility margins are on top;

$\rho_E$ in descending order, so that the resources with the highest SoE are on top.

To decide whether two resources i, j have the same metric $\rho$ we use an approximate equality test, namely $|\rho(i) - \rho(j)| \leq \alpha$ for some small $\alpha \geq 0$. Let $\mathcal{I}(1)$ denote the best-rated resource.

B. Computation of Shedding List

First, we assume that the GA has access to a priority-order list of devices to shed. This list is used to continuously test the feasibility of the best slack candidate to cope with the unintentional islanding. The priority-ordered list can be computed using the advertised information (e.g., non-controllable resources with large belief functions) and some external information about the criticality of the resources. We consider this order to be fixed during the islanding maneuver, and the exact procedure for its computation is out of the scope of this paper. We define now the shedding list $\mathcal{S}$, which is the result of checking the admissibility of the best slack candidate in case the islanded operation takes place. Formally, if shedding is necessary, i.e., if $\rho_U(\mathcal{I}(1)) = 1$, we follow the next procedure:

(a) The first element of the priority-ordered list is added to $\mathcal{S}$. (b) We recompute $\rho_U(\mathcal{I}(1))$, i.e., the setpoint-admissibility metric of the selected slack $\mathcal{I}(1)$ with this new state of the shedding list.

(c) If $\rho_U(\mathcal{I}(1)) = 0$, we stop, otherwise we add to $\mathcal{S}$ the next element of the priority-ordered list and go back to the previous step. We do this until $\rho_U(\mathcal{I}(1)) = 0$ or the priority-ordered list is exhausted.

C. GA Operation During Islanding Maneuver

Figure 4:
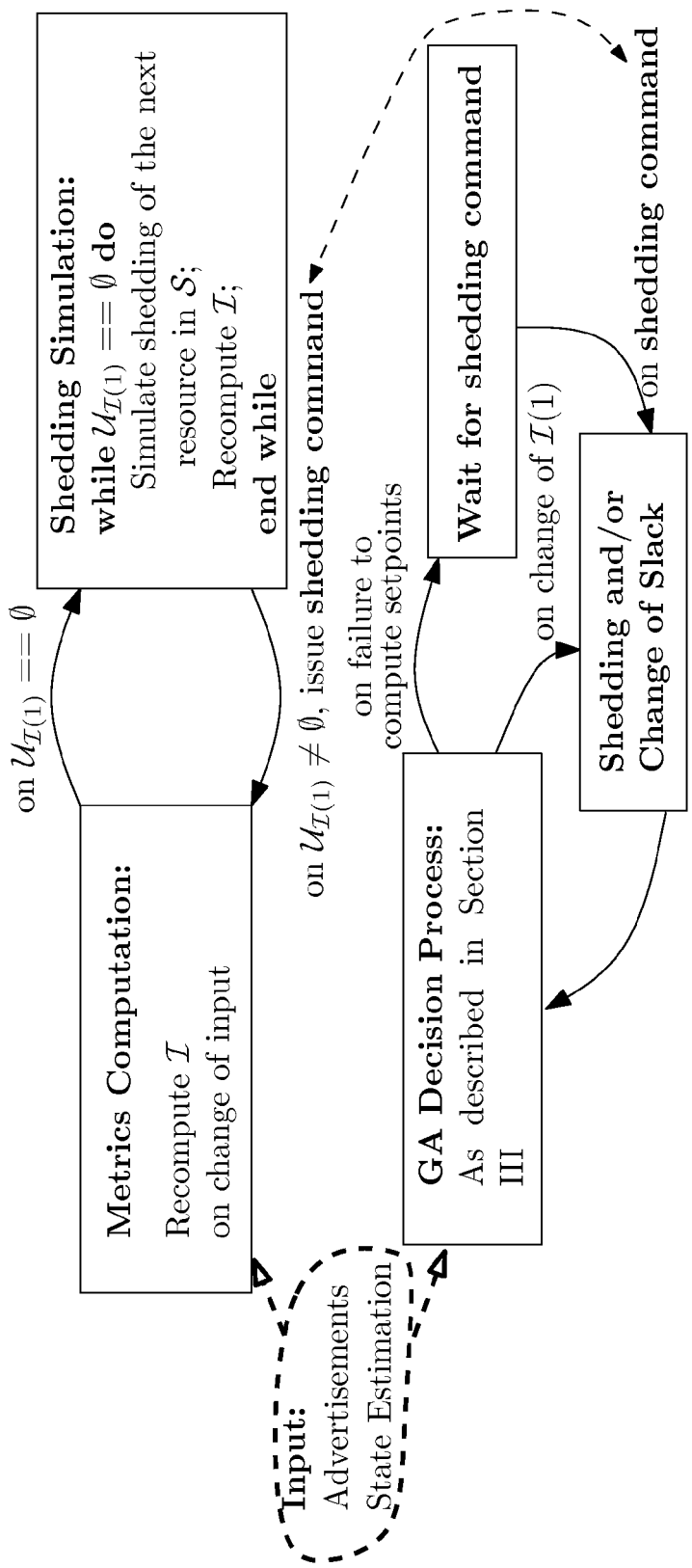
FIG. 4 is an illustration of the GA operation during islanding maneuver.

Recall that, as the first step, the islanding conditions are detected using real-time state estimation. As a result, the elements of $\mathcal{S}$ are shed and the resource $\mathcal{I}(1)$ is set to be the slack. From that time on, the procedure illustrated in FIG. 4 is applied. We note that the condition $\mathcal{U}_{\mathcal{I}(1)} = \emptyset$ can be detected in the "Metric Computation" block before the regular decision process of the GA fails to compute the setpoint. This is true because in order to detect this condition, we only need to verify whether it is possible to project to $\mathcal{U}_{\mathcal{I}(1)}$ as discussed in Section A4.

Performance Evaluation

We compare the performance of the proposed islanding maneuver using the Commelec framework to that of an extended version of the load drop anticipator technique. The proposed extension makes this technique able to work with inertia-less systems. The selected case study is shown in FIG. 1; it is based on the CIGRÉ benchmark LV microgrid from [10]. In order to better show the performance of the proposed method, we replaced one uncontrollable load with a high power/low energy storage device (ESS2) that represents a supercapacitor array (SC). We model the 14 behavior of the SC based on [11].

Figure 5:
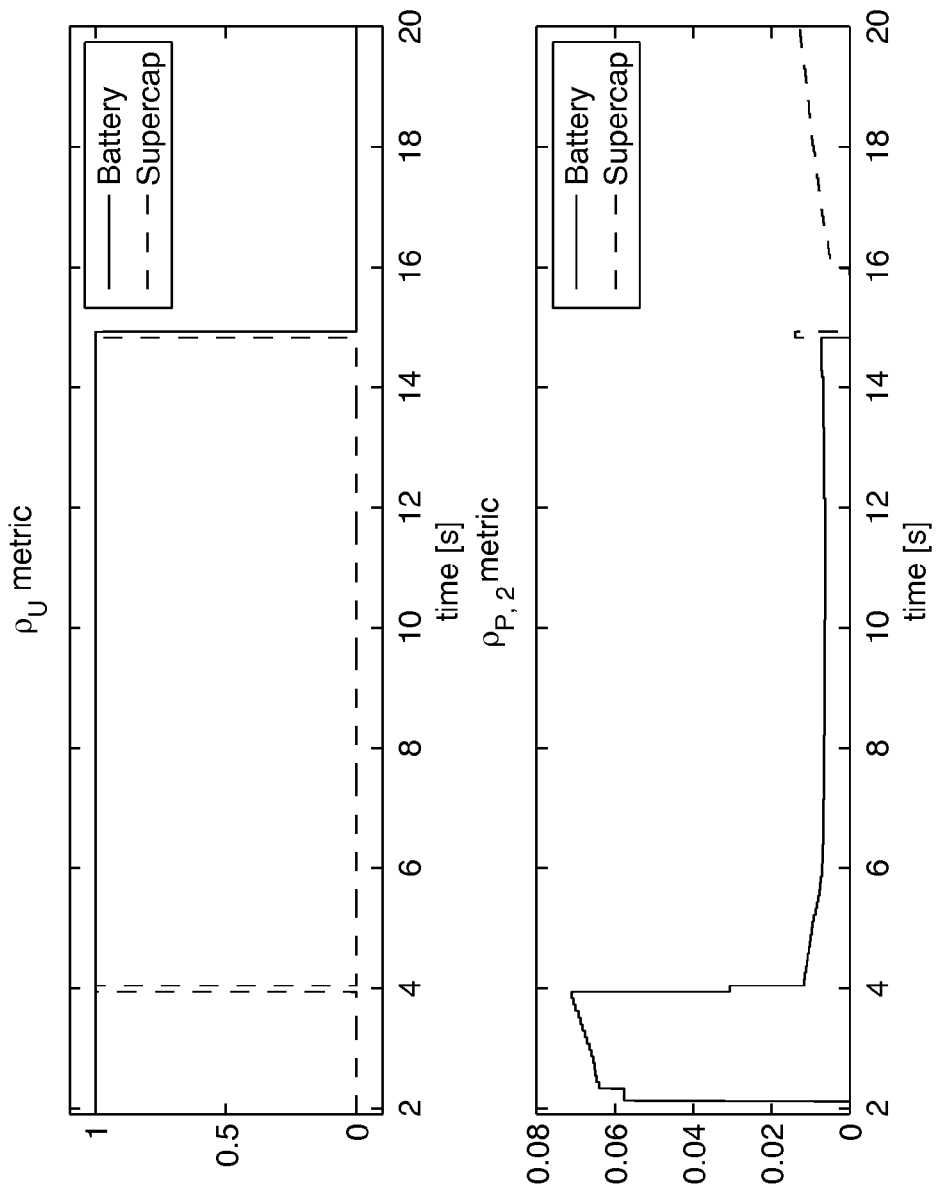
FIG. 5 shows graphs for relevant islanding metrics.

The islanding is performed at t=2 s with the SC as a default slack resource. At this point, the state-of-charge of the array is 25% (corresponding to the SoE of 4.5 kWh), which is close to its minimum values. The SC is able to absorb the whole imbalance at this time. At time t=4 s, due to the shrinkage of the PQ profile of the SC, the admissible set $\mathcal{U}$ becomes empty. This is shown in FIG. 5 that depicts the islanding metrics $\rho_U$ and $\rho_{P,2}$. In particular, $\rho_U=1$ for the SC at t=4 s. Since $\rho_U=1$ for the battery as well, the shedding of the two loads is performed (UL1 and UL2). As a result, the SC continues to operate as slack until t=15 s. At this time, again due to the shrinkage of the PQ profile of the SC, the admissible set becomes empty again, and another load is shed (UL3). As a result both the battery and the SC have non-empty admissible sets ($\rho_U=0$). However, the power violation is now smaller in the battery ($\rho_{P,2}$ metric in FIG. 5), and hence the slack is switched to the battery. As can be seen from FIG. 6, the DC voltage and current of the SC are kept within the feasible region during the islanding maneuver. This is achieved in the Commelec framework since the SC agent exposes correctly the internal constraints of the device—to this end, an appropriate SC agent has been developed—via the advertised PQ profile. The corresponding AC power profiles of relevant resources are shown in FIG. 7. It is worth mentioning that during the maneuver, the GA maintains the QoS of the grid in the feasible set and prevents the SC from being completely depleted. These figures are omitted due to space constraints.

Figure 6:
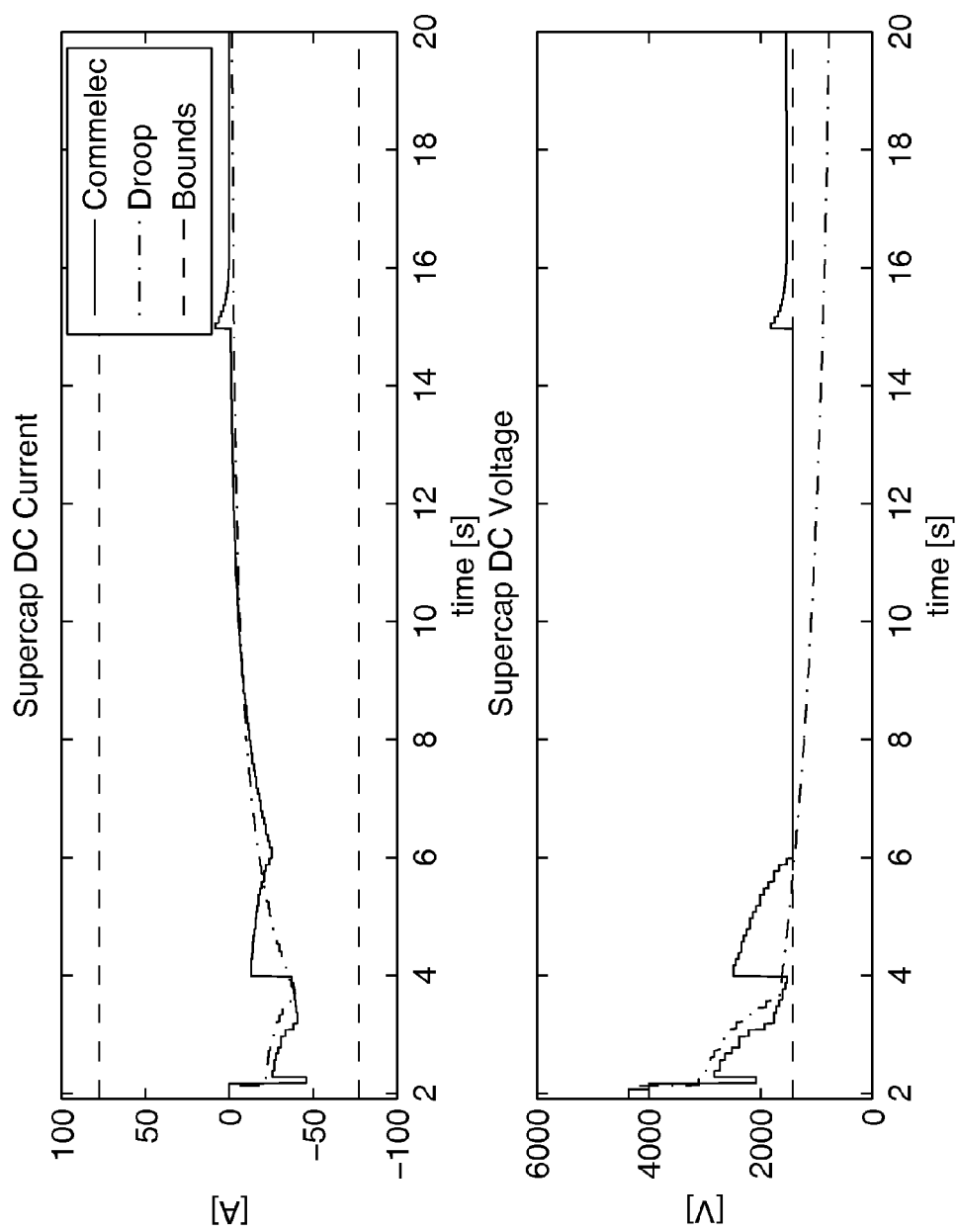
FIG. 6 shows supercaps DC voltage and current. Dashed lines represent the upper and lower bounds for the voltage/current. As the upper bound on voltage is much higher than the actual values, it not shown in the graph.
Figure 7:
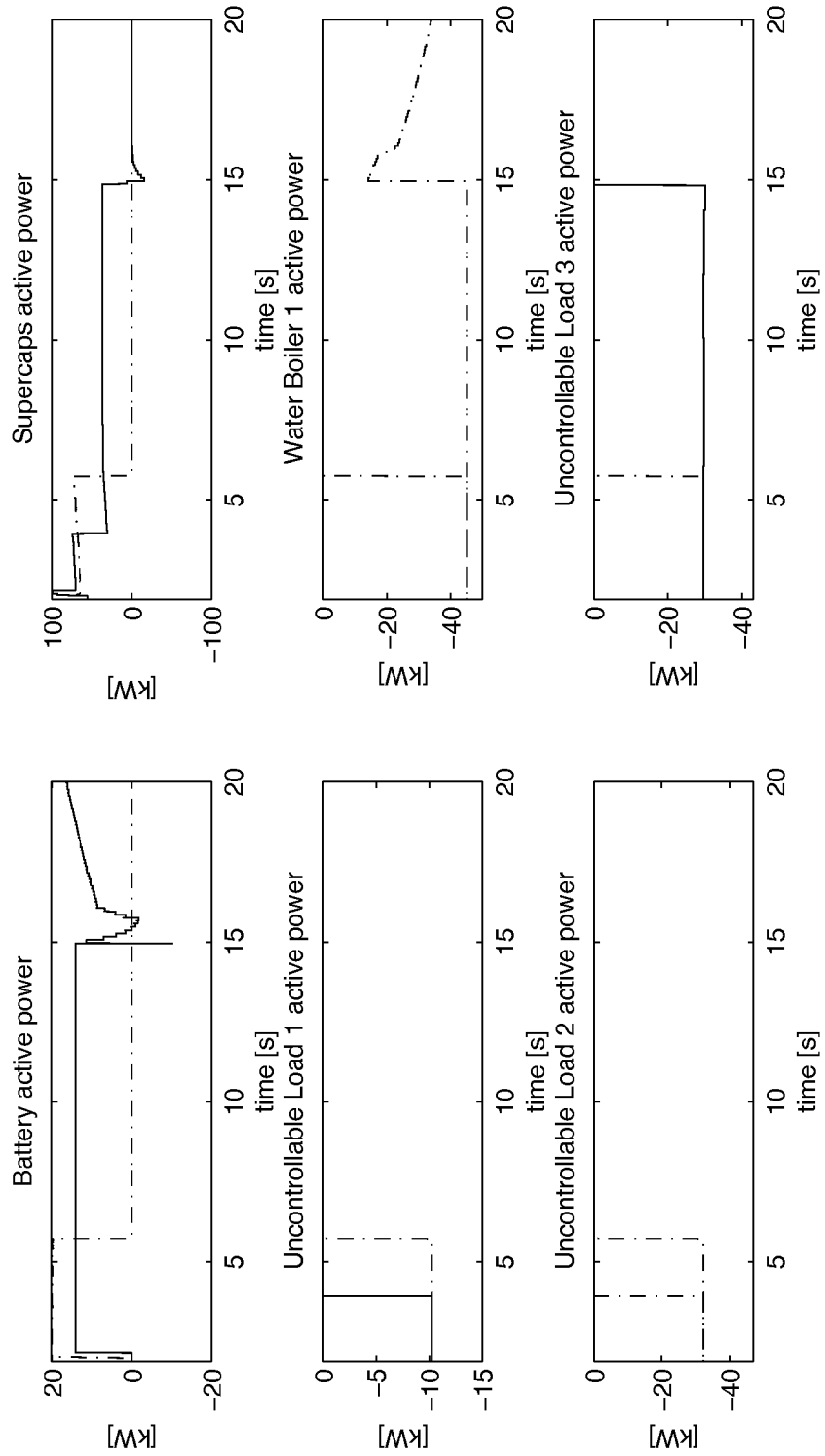
FIG. 7 shows graphs with AC power of different resources.

In contrast, in the same scenario, the droop-based technique leads to the violation of the lower bound on DC voltage of the SC in seconds, as shown in FIG. 6. In particular, it can be seen in FIG. 7 that at around t=5.7 s, the SC trips due to this violation, which leads to a failure of the islanding maneuver.

CONCLUSION

We have proposed a method to cope with the safe unintentional islanding transition of microgrids using the Commelec real-time control framework. Contrary to the standard methods available in the literature, this method is able to choose the best slack resource based on the information obtained from the resource agents, and to switch the slack to a better resource adaptively during the islanding maneuver. Moreover, as the GA has a global view of the network's quality-of-supply and its resources, it optimizes the performance of the network during and after the islanding transition. Finally, the method is suitable for inertia-less systems as the control is performed using explicit power setpoints and does not rely on the frequency signal.

REFERENCES

[1] A. Bernstein, L. Reyes-Chamorro, J.-Y. Le Boudec, and M. Paolone. A composable method for real-time control of active distribution networks with explicit power setpoints, 2014. arXiv:1403.2407.
[2] Jeffrey M. Bloemink and M. Reza Iravani. Control of a multiple source microgrid with built-in islanding detection and current limiting. *IEEE Transactions on Power Delivery*, 27(4):2122-2132, October 2012.
[3] Hsiao-Dong Chiang and M. E. Baran. On the existence and uniqueness of load flow solution for radial distribution power networks. *IEEE Transactions on Circuits and Systems*, 37(3):410-416, 1990.
[4] T. E. Del Carpio-Huayllas, D. S. Ramos, and R. L. Vasquez-Arnez. Micro-grid transition to islanded modes: Conceptual background and simulation procedures aimed at assessing its dynamic performance. In *Proceedings of the 2012 IEEE PES Transmission and Distribution Conference and Exposition (T&D)*.
[5] A. G. Expo'sito, A. Abur, A. de la Villa Jae'n, and C. Go'mez-Quiles. A multilevel state estimation paradigm for smart grids. in *Proceedings of the IEEE*, 99(6):952-976, June 2011.
[6] Qiang Fu, AdelNasiri, Vijay Bhavaraju, Ashish Solanki, Tarek Abdallah, and David C. Yu. Transition management of microgrids with high penetration of renewable energy. *IEEE Transactions on Smart Grid*, 5(2):539-549, March 2014.
[7] J. A. Pec,as Lopes, C. L. Moreira, and A. G. Madureira. Defining control strategies for microgrids islanded operation. *IEEE Transactions on Power Systems*, 21(2):916-924, 2006.
[8] R. Palma, C. Benavides, F. Lanas, B. Severino, L. Reyes, J. Llanos, and D. Saez. A microgrid energy management system based on the rolling horizon strategy. *IEEE Transactions on Smart Grid*, 4(2):996-1006, May 2013.
[9] M. Paolone, M. Pignati, P. Romano, S. Sarri, L. Zanni, and R. Cherkaoui. A hardware-in-the-loop test platform for the real-time state estimation of active distribution networks using phasor measurement units. *Proceedings of the CIGRE SC C6 Colloquium in Yokohama, Japan*, Oct. 6-9, 2013.
[10] S. Papathanassiou, N. Hatziargyriou, and K. Strunz. A benchmark low voltage microgrid network. In *Proceedings of the CIGRE' Symposium "Power Systems with Dispersed Generation: technologies, impacts on development, operation and performances"*, April 2005, Athens, Greece.
[11] D. Torregrossa, M. Bahramipanah, E. Namor, R. Cherkaoui, and M. Paolone. Improvement of dynamic modeling of supercapacitor by residual charge effect estimation. *Industrial Electronics, IEEE Transactions on*, 61(3):1345-1354, March 2014.

The invention claimed is:

1. A method for coping with an unintentional islanding of an electrical distribution grid within a Commelec-type framework for the real-time control of micro-grids, of Resource Agents (RA) controlled by Grid Agents (GA), comprising at least:

maintain at any time before the unintentional islanding occurs a rating of all resource agents controlled by a same grid agent in view of their ability to be a slack resource, by computing the rating based on a power availability and on a state-of-energy of each resource, the state-of-energy quantifying an amount of energy that may be withdrawn from a potential slack irrespectively of a PQ profile, whereby the PQ profile describes bounds for active and reactive power that a resource can inject or absorb; wherein the rating all the resource agents comprises the computation of a metric pc (i) for resource agent i, that measures the distance between a request (P,Q), and a belief function BFi (P, Q) advertised by resource agent i representing the set of all possible power setpoints that resource i is enabled to implement when instructed by the grid agent to do (P, Q);

and a shedding list of all the resources that have to be shed if a current best candidate slack resource is selected, the current best candidate slack resource being the slack resource having the best rating of all resources as determined in the step of rating all resource agents, the shedding list being obtained by computing from an uncertainty of the resources and a predetermined order of shedding priority;

continuously monitor islanding conditions via an available real-time state estimation process, and when an islanding condition is detected, causing the grid agent to shed all resources in the shedding list and choose an initial slack based on the rating obtained before the islanding occurrence from the step of rating of all resource agents.

2. The method of claim 1, wherein when an islanding condition has been detected, the rating of all resource agents is monitored, and in case the rating is found to have changed, the grid agent chooses a new slack.

3. The method of claim 1, wherein an operation of the Commelec-type framework is monitored, and when it is found that there is no feasible operation point with the selected slack, the grid agent performs a further shedding of all resources in the shedding list, and wherein when an islanding condition has been detected, the rating of all resource agents is monitored, and in case the rating is found to have changed, the grid agent chooses a new slack.

4. The method of claim 1, wherein the rating of all resource agents comprises from each of all resource agents controlled by the same grid agent, sending its state-of-energy to the same grid agent.

5. The method of claim 1, wherein the rating of all the resource agents comprises the computation of a metric $\rho_U(i)$ that indicates whether resource i is an admissible slack without shedding any other resource, $\rho_U(i)$ is computed by first evaluating the set $\mathcal{U}_i$ of admissible setpoints when resource i is the slack, and setting $\rho_U(i)=1$ if $\mathcal{U}_i$ is empty and zero otherwise.

6. The method of claim 1, further comprising measuring the electrical state of the grid; and
wherein the rating of all the resource agents further comprises a computation of a first metric $\rho_{P,1}(i)$ and a second metric $\rho_{P,2}(i)$ that together measure an ability of the resource i to absorb an imbalance in the grid created by the measured electrical state of the grid taking into account uncertainties as represented by belief functions advertised by resource agent i, specifically, whereby the first metric $\rho_{P,1}(i)$ measures a safety margin of the resource i and when the safety margin is null, the second metric $\rho_{P,2}(i)$ quantifies an amount of maximum violation of resource i.

7. The method of claim 1, wherein the rating of all the resource agents further comprises the computation of a third metric $\rho_{Y,1}(i)$ and a fourth metric $\rho_{Y,2}(i)$, computed according to $$\rho_{Y,1} \triangleq \min_{y \in y_i(\hat{x}_{-i})} d(y, \mathcal{F}_i^c) \text{ and}$$

$$\rho_{Y,2} \triangleq \max_{y \in y_i(\hat{x}_{-i})} d(y, \mathcal{F}_i) \text{, where}$$

$$y_i(u_{-i}) \triangleq \{y = Y_i(x_{-i} \mid i): x_{-i} \in BF_{-i}(u_{-i})\}$$

denote the set of all possible electrical states that may result from the uncertainty of all resources but i when i is the slack, the third metric and the fourth metric measuring an ability of resource i to provide a feasible electrical state when it is the slack, taking into account uncertainties represented by belief functions advertised by resource agent i, specifically, whereby the first metric $\rho_{Y,1}(i)$ measures the safety margin of resource i and when the safety margin is null, the second metric $\rho_{Y,2}(i)$ quantifies an amount of maximum violation of resource i.

8. The method of claim 5, wherein the rating of all resource agents comprises the computation of a metric $\rho_U(i)$ that indicates whether resource i is an admissible slack without shedding any other resource, $\rho_U(i)$ is computed by first evaluating the set $\mathcal{U}_i$ of admissible setpoints when resource i is the slack, and setting $\rho_U(i)=1$ if $\mathcal{U}_i$ is empty and zero otherwise.

9. The method of claim 8, further comprising measuring the electrical state of the grid; and
wherein the rating of all the resource agents further comprises a computation of a first metric $\rho_{P,1}(i)$ and a second metric $\rho_{P,2}(i)$ that together measure an ability of the resource i to absorb an imbalance in the grid created by the measured electrical state of the grid taking into account uncertainties as represented by belief functions advertised by resource agent i, specifically, whereby the first metric $\rho_{P,1}(i)$ measures a safety margin of the resource i and when the safety margin is null, the second metric $\rho_{P,2}(i)$ quantifies an amount of maximum violation of resource i.

10. The method of claim 9, wherein the rating of all the resource agents further comprises the computation of a third metric $\rho_{Y,1}(i)$ and a fourth metric $\rho_{Y,2}(i)$, computed according to $$\rho_{Y,1} \triangleq \min_{y \in y_i(\hat{x}_{-i})} d(y, \mathcal{F}_i^c) \text{ and}$$

$$\rho_{Y,2} \triangleq \max_{y \in y_i(\hat{x}_{-i})} d(y, \mathcal{F}_i) \text{, where}$$

$$y_i(u_{-i}) \triangleq \{y = Y_i(x_{-i} \mid i): x_{-i} \in BF_{-i}(u_{-i})\}$$

denote the set of all possible electrical states that may result from the uncertainty of all resources but i when i is the slack, the third metric and the fourth metric measuring an ability of resource i to provide a feasible electrical state when it is the slack, taking into account uncertainties represented by belief functions advertised by resource agent i, specifically, whereby the first metric $\rho_{Y,1}(i)$ measures the safety margin of resource i and when the safety margin is null, the second metric $\rho_{P,2}(i)$ quantifies an amount of maximum violation of resource i.

11. The method of claim 10, wherein the steps of computing of the rating comprises executing by the grid agent at least following steps in the following order:
a. computation of a fifth metric $\rho_T(i)$ according to $\rho_T(i) = \rho_E(i)/\check{P}_i$, where $\check{P}_i$ denotes the corresponding active power, the fifth metric estimating a survival time of the resource i when the resource i is used as a slack;
b. filtering out non-controllable resources and resources that have too short survival time, through the grid agent filtering out the non-controllable resources that are not controlled by the Commelec grid agent, and the resources that have too short a survival time, the resources that have too short a survival time being those for which $\rho_C(i) \leq \in$, $\rho_T(i) \geq \delta$, for some $\in \geq 0$ and $\delta > 0$, the value of $\in$ representing the maximum allowed deviation of the actually implemented setpoint from the requested one in percentage from the requested one;
c. computation of a sixth metric $\rho_E(i)$ that measures the state of energy of a given resource i;
d. sorting the resources lexicographically,
$\rho_U$, so that resources with $\rho_U(i)=0$, namely, having non-empty set of admissible setpoints, are on top;
$\rho_{P,2}$ in ascending order, so that resources with the least violation of slack power feasibility are on top;

$\rho_{Y,2}$ in ascending order, so that resources with the least violation of state feasibility are on top;

$\rho_{P,1}$ in descending order, so that resources with the maximum power availability are on top;

$\rho_{Y,1}$ in descending order, so that resources with the maximum state feasibility margins are on top;

$\rho_E$ in descending order, so that the resources with the highest SoE are on top;

thereby finding a best-rated resource.

* * * * *